US006693743B2

(12) United States Patent
Zhao

(10) Patent No.: US 6,693,743 B2
(45) Date of Patent: Feb. 17, 2004

(54) BIREFRINGENT DEVICES

(75) Inventor: Bin Zhao, Irvine, CA (US)

(73) Assignee: Cirvine Corporation, Irvine, CA (US)

( * ) Notice: Subject to any disclaimer, the term of this patent is extended or adjusted under 35 U.S.C. 154(b) by 0 days.

(21) Appl. No.: 09/876,602

(22) Filed: Jun. 7, 2001

(65) Prior Publication Data

US 2001/0053024 A1 Dec. 20, 2001

Related U.S. Application Data

(60) Provisional application No. 60/210,046, filed on Jun. 7, 2000, and provisional application No. 60/210,051, filed on Jun. 7, 2000.

(51) Int. Cl.$^7$ ................................................. G02B 5/30
(52) U.S. Cl. ...................... 359/495; 359/496; 359/497
(58) Field of Search ................................. 359/494, 495, 359/496, 497, 499; 356/491, 493

(56) References Cited

U.S. PATENT DOCUMENTS

| 3,677,621 | A | * | 7/1972 | Smith |  |
|---|---|---|---|---|---|
| 3,881,823 | A | * | 5/1975 | De Lang et al. |  |
| 4,247,166 | A |  | 1/1981 | Yeh | 350/374 |
| 4,500,178 | A |  | 2/1985 | Yeh | 350/404 |
| 4,516,837 | A | * | 5/1985 | Soref et al. |  |
| 4,548,479 | A |  | 10/1985 | Yeh | 350/404 |
| 4,702,603 | A | * | 10/1987 | Augustyn |  |
| 4,969,720 | A | * | 11/1990 | Lins et al. |  |
| 5,062,694 | A |  | 11/1991 | Blair | 359/498 |
| 5,251,058 | A | * | 10/1993 | MacArthur |  |
| 5,301,010 | A | * | 4/1994 | Jones et al. |  |
| 5,471,340 | A |  | 11/1995 | Cheng et al. | 359/281 |
| 5,574,596 | A |  | 11/1996 | Cheng | 359/484 |
| 5,596,410 | A | * | 1/1997 | Hantel et al. |  |
| 5,606,439 | A |  | 2/1997 | Wu | 349/117 |
| 5,682,446 | A |  | 10/1997 | Pan et al. | 385/11 |
| 5,694,233 | A |  | 12/1997 | Wu et al. | 359/117 |
| 5,724,165 | A |  | 3/1998 | Wu | 359/117 |
| 5,768,005 | A | * | 6/1998 | Cheng et al. |  |
| 5,818,981 | A |  | 10/1998 | Pan et al. | 385/11 |
| 5,867,291 | A |  | 2/1999 | Wu et al. | 359/124 |
| 5,978,116 | A |  | 11/1999 | Wu et al. | 359/124 |
| 6,005,697 | A |  | 12/1999 | Wu et al. | 359/117 |
| 6,049,427 | A |  | 4/2000 | Bettman | 359/484 |
| 6,243,200 | B1 | * | 6/2001 | Zhou et al. |  |
| 6,307,677 | B2 | * | 10/2001 | Cao |  |
| 6,360,037 | B1 | * | 3/2002 | Riza |  |
| 6,421,177 | B1 | * | 7/2002 | Leyva et al. |  |

OTHER PUBLICATIONS

Carl F. Buhrer; *Synthesis and tuning of high–order Solc–type birefringent filters*, Applied Optics, Apr. 20, 1994, vol. 33, No. 12, pp. 2249–2254.

Tatsuya Kimura, Masatoshi Saruwatari; *Temperature Compensation of Birefringent Optical Filters*; Proceeding Letters, Aug. 1971, pp. 1273–1274.

(List continued on next page.)

*Primary Examiner*—Ricky D. Shafer
(74) *Attorney, Agent, or Firm*—Rutan & Tucker

(57) ABSTRACT

A birefringent device has a polarization separating device configured to separate a first composite light beam into first and second components thereof. The first and second components are orthogonally polarized with respect to one another. A first path is configured to transmit the first component and has a first optical path length. Similarly, a second path is configured to transmit the second component and has a second optical path length. The second optical path length is different from the first optical path length. A polarization combining device is configured to recombine the first and second components so as to form a second composite light beam. The second composite light beam is birefringent with respect to the first composite light beam.

6 Claims, 7 Drawing Sheets

OTHER PUBLICATIONS

Carl F. Buhrer; *Four waveplate dual tuner for birefringent filters and multiplexers;* Applied Optics, Sep. 1, 1987, vol. 26, No. 17, pp. 3628–3632.

P. Melman, W. J. Carlsen, B. Foley; *Tunable Birefringent Wavelength–Division Multiplexer/Demultiplexer,* Electronics Letters, Jul. 18, 1985, vol. 21, No. 15, pp. 634 and 635.

Yohji Fujii; *Tunable wavelength multi/demultiplexer using a variable retardation phase plate;* Applied Optics, Aug. 20, 1990, vol. 29, No. 29, pp 3465–3467.

S.E. Harris, E.O. Ammann, I. C. Chang; *Optical Network Synthesis Using Birefringent Crystals. * I. Synthesis of Lossless Networks of Equal–Length Crystals,* Journal of the Optical Society of America, Oct. 1964, vol. 564, No. 10, pp. 1267–1279.

Tatsuya Kimura, Masatoshi Saruwatari, and Kenju Otsuka; *Birefringent Branching Filters for Wideband Optical FDM Communications;* Applied Optics, Feb. 1973, vol. 12, No. 2, pp. 373 to 379.

Godfrey R. Hill; *Wavelength Domain Optical Network Techniques;* Proceedings of the IEEE, Jan. 1989, vol. 77, No. 1, pp. 121 to 132.

J. M. Senior, S.D. Cusworth; *Devices for Wavelength Multiplexing and Demultiplexing;* IEE Proceedings, Jun. 1989, vol. 136, Pt. J. No. 3, pp. 183–202.

* cited by examiner

0

1     2     3

4     5     6

7

BIREFRINGENT DEVICES

CROSS-REFERENCE TO RELATED APPLICATIONS

This patent application claims the benefit of the priority date of U.S. Patent Application No. 60/210,046 filed on Jun. 7, 2000 and entitled APPARATUS FOR BIREFRINGENT DEVICES and also claims the benefit of the filing date of U.S. Provisional Patent Application No. 60/210,051, filed on Jun. 7, 2000 and entitled SPATIAL BIREFRINGENT DEVICES, the entire contents of both of which are hereby expressly incorporated by reference.

This patent application is related to co-pending patent application Ser. No. 09/876,484, filed on Jun. 7, 2001 entitled LOW CROSSTALK FLAT BAND FILTER; co-pending patent application Ser. No. 09/876,368, filed on Jun. 7, 2001 entitled INTERLEAVER USING SPATIAL BIREFRINGENT ELEMENTS; co-pending patent application Ser. No. 09/876,819, filed on Jun. 7, 2001 entitled COMB FILTER FOR DENSE WAVELENGTH DIVISION MULTIPLEXING; co-pending patent application Ser. No. 09/876,647, filed on Jun. 7, 2001 entitled APPARATUS AND METHOD FOR LOW DISPERSION IN COMMUNICATIONS; all filed on the instant date herewith and commonly owned by the Assignee of this patent application, the entire contents of all which are hereby expressly incorporated by reference.

FIELD OF THE INVENTION

The present invention relates generally to optical devices and relates more particularly to a birefringent device which provides a birefringent effect without using a birefringent crystal.

BACKGROUND OF THE INVENTION

Birefringent devices which comprise birefringent crystals are commonly used in optical applications and are well known. For example, birefringent crystals are commonly used in Solc filters for separating multiplexed optical channels in dense wavelength division multiplexing (DWDM) communication systems. Thus, birefringent devices are important device elements in optical signal processing applications and the like.

Birefringent crystals are materials in which the phase velocity of an optical beam propagating therein depends upon the polarization direction of the optical beam. As mentioned above, birefringent devices are important elements in optical signal processing applications and the like. However, birefringent devices which comprise birefringent crystals suffer from inherent limitations which seriously degrade their performance, limit their application and reduce their desirability. Contemporary crystal birefringent devices suffer from limitations imposed by the crystal's physical, mechanical and optical properties, as well as by problems associated with temperature instability. Further, such contemporary crystal birefringent devices have comparatively small birefringent values. The crystals utilized in such contemporary crystal birefringent devices are comparatively high in cost, both with regard to the synthesis thereof and with regard to their use in fabrication of optical devices, e.g., birefringent devices.

Further, such contemporary crystal birefringent devices have a fixed birefringent value (not taking into consideration undesirable variations due to their temperature instability) and are thus not tunable.

It is desirable to provide a birefringent device which does not utilize a birefringent crystal and thus does not suffer from the inherent shortcomings thereof. More particularly, it is desirable to provide a birefringent device which has comparatively good temperature stability, provides a comparatively wide range of birefringent values, is tunable, and is comparatively less expensive to produce and utilize.

SUMMARY OF THE INVENTION

The present invention specifically addresses and alleviates the above-mentioned deficiencies associated with the prior art. More particularly, the present invention comprises a birefringent device comprising a polarization separating device configured to separate a first composite light beam into first and second components thereof. The first and second components are orthogonally polarized with respect to one another. A first path is configured to transmit the first component and has a first optical path length. A second path is configured to transmit the second component and has a second optical path length. The second optical path length is different from the first optical path length. A polarization combining device is configured to recombine the first and second components, so as to form a second composite light beam. The second composite light beam is birefringent with respect to the first composite light beam.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

These, and other features, aspects and advantages of the present invention, will be more fully understood when considered with respect to the following detailed description, appended claims and accompanying drawings, wherein:

DETAILED DESCRIPTION OF THE INVENTION

Figure 1:
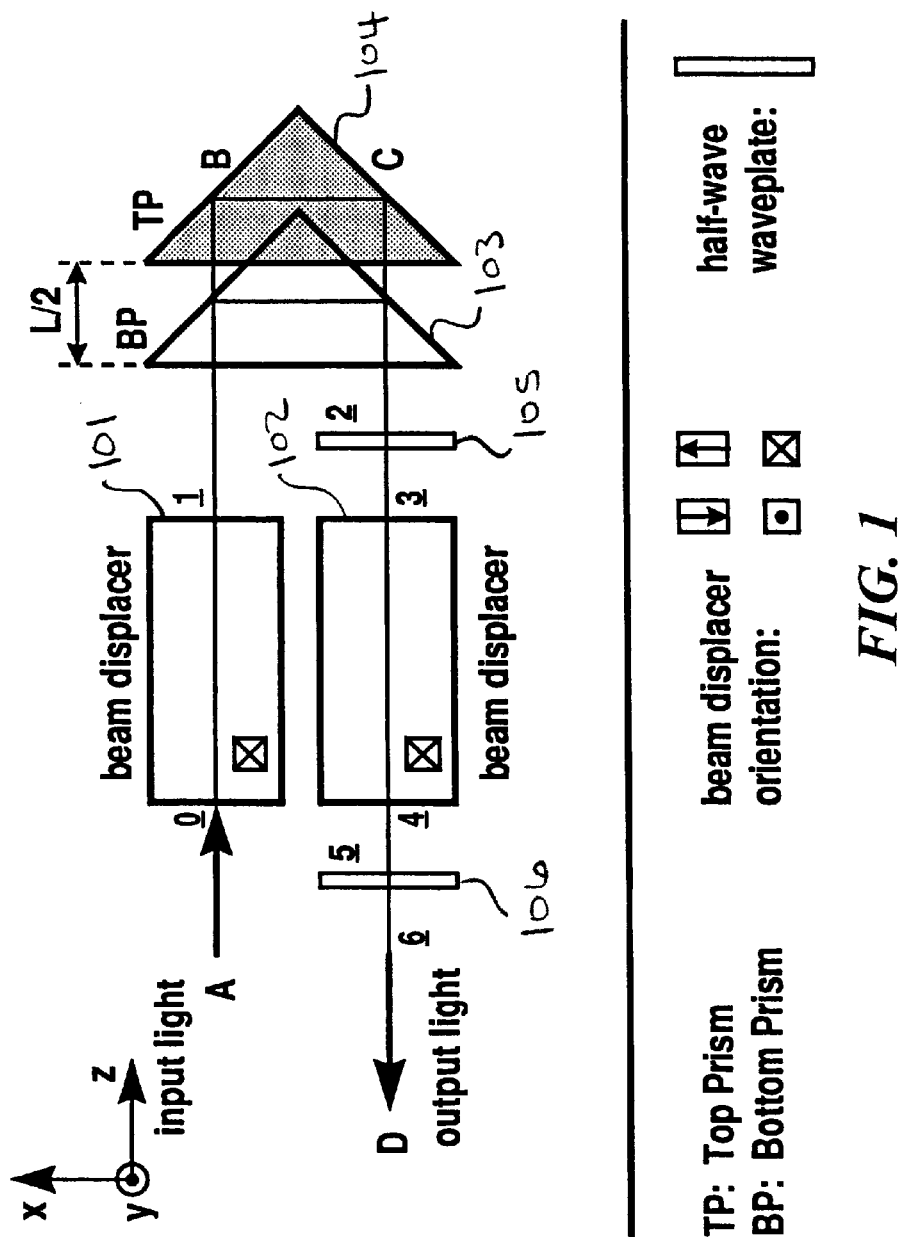
FIG. 1 is a schematic diagram showing a top view of an exemplary birefringent device which utilizes two polarization beam displacers and two prisms according to the present invention.

The detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The description contained herein is directed primarily to the configuration of an interleaver as a demultiplexer. However, as those skilled in the art will appreciate, the present invention may be used in both demultiplexers and multiplexers. The difference between demultiplexers and multiplexers is small and the configuration of the present invention as either desired device is well within the ability of one of the ordinary skill in the art.

Two different reference systems are used in this patent application for the determination of angular orientations. One reference system is used for the determination of the angular orientations of birefringent elements, such as birefringent crystals, with respect to the polarization direction of input light. Another reference system is used for the determination of the angular orientations of birefringent elements and the angular orientations of waveplates with respect to a moving (x, y, z) coordinate system. Thus, for the birefringent element angular orientations, two separate reference systems are utilized. Thus, when reading the detailed description below, it will be very helpful to understand these two reference systems.

When angular orientation of birefringent element is discussed, the angular orientation is typically the fast axis of the birefringent element with respect to the polarization direction of incoming light just prior to the incoming light reaching the birefringent element. Determination of the angular orientation is made by observing oncoming light with the convention that the angle is positive if the rotation of the fast axis is clockwise with respect to the polarization direction of the oncoming light and is negative if the rotation is counter-clockwise with respect to the polarization direction of the oncoming light.

If there is a series of birefringent elements, such as in a birefringent filter, the angular orientations of each of the elements of the filter are measured by their fast axes with respect to the polarization direction of incoming light just prior to the incoming light reaching the first birefringent element of the filter. If there are more than one birefringent filters in a sequence, then the angular orientations are determined separately for each birefringent filter (the angular orientations are measured with respect to the polarization direction of incoming light just prior to the incoming light reaching the first birefringent element of each different filter). Thus, each birefringent filter has its own independent reference for the determination of the angular orientations of the birefringent elements thereof.

By the way of contract, the angular orientation of birefringent elements and angular orientations of waveplates are also measure by the fast axes of birefringent elements and the optic axes of waveplates with respect to the +x axis. However, it is very important to appreciate that the +x axis is part of the moving coordinate system. This coordinate system travels with the light, such that the light is always traveling in the +z direction and such that the +y axis is always up as shown in the drawings. Thus, when the light changes direction, the coordinate system rotates with the +y axis thereof so as to provide a new coordinate system. The use of such a moving coordinate system allows the optical beam states, the birefringent elements, and the waveplates to be viewed in a consistent manner at various locations in the devices, i.e., always looking into the light, and therefore substantially simplifies viewing and analysis of the devices.

Determination of the angular orientations in (x, y, z) coordinate system is made by observing oncoming light with the convention that the angle is positive if the rotation of the corresponding optical axis is counter-clockwise with respect to +x axis and is negative if the rotation is clockwise with respect to the +x axis (which is consistent the conventional use of (x, y, z) coordinate system, but which is contrary to the sign convention for determining the angular orientations of birefringent elements with respect to the input polarization direction, as discussed above).

As those skilled in the art will appreciate, an interleaver is an optical device which typically includes at least one birefringent filter. Further, a birefringent filter is one example of a comb filter.

The present invention comprises a method and apparatus for providing birefringence without the use of a birefringent crystal. The method comprises separating a first composite light beam into first and second components thereof, wherein the first and second components are orthogonally polarized with respect to one another. The first component is transmitted along a first path and the second component is transmitted along a second path. The first and second paths have different optical path lengths. The first and second components are recombined, so as to form a second composite light beam. The second composite light beam is birefringent with respect to the first composite light beam, because the first and second paths have different optical path lengths and the different optical path lengths cause the light traveled along the first and second paths to be recombined with a relative phase shift therebetween.

Thus, according to the present invention, different optical paths simulate the effect of a birefringent crystal for components of a composite light beam which have been separated and which are subsequently recombined. The different optical path lengths may be provided either by having different physical path lengths, i.e., wherein each component travels a different physical distance in the same type of medium (for example, one component may travel four centimeters, while the other component travels five centimeters), or, alternatively, the different optical path lengths may be provided by transmitting the light through materials having different indices of refraction. Any desired combination of physical path lengths and indices of refraction may be utilized so as to provide the desired different optical path lengths, according to well known principles.

According to the present invention, a birefringent device comprises a polarization separating device which is configured to separate a first composite light beam into first and second components thereof, where the first and second components are orthogonally polarized with respect to one another. As used herein, the term "polarization separating device" is defined to include any device which will separate a composite light beam (a light beam containing components having different polarizations) into differently (such as orthogonally) polarized components thereof. Thus, for example, the polarization separating device may comprise a polarization beam displacer (PBD) or a polarization beam splitter (PBS).

A first path is configured to transmit the first component and a second path is configured to transmit the second component. The first path has a first optical path length and the second path has a second optical path length. The first optical path length is different with respect to the second optical path length. Thus, as described above, a birefringent effect is provided.

A polarization combining device is configured to recombine the first and second components, so as to form a second composite light beam. The second composite light beam is birefringent with respect to the first composite light beam. As used herein, the term "polarization combining device" is defined to include any device which will combine light components having different polarizations into a composite light beam containing those components.

According to the present invention, the polarization separating device and the polarization combining device may each comprise a polarization beam displacer, a polarization beam splitter, or any desired combination thereof. Thus, for example, both the polarization separating device and the polarization combining device may comprise a polarization beam displacer, or the polarization separating device may comprise a polarization beam displacer while the polarization combining device comprises a polarization beam splitter.

When both the polarization separating device and the polarization combining device comprise polarization beam displacers, then both the polarization separating device and the polarization combining device may comprise a common, i.e., the same, polarization beam displacer. That is, the first composite light beam is separated by a polarization beam displacer into first and second components thereof, and then (after having traveled different paths) the first and second components are subsequently recombined by the same polarization beam displacer so as to form the second composite beam. Thus, the birefringent device may comprise either one or two polarization beam displacers, as desired.

If two polarization beam displacers are utilized, then the two polarization beam displacers may be disposed side-by-side with respect to one another and mirrors and/or prisms may be utilized so as to direct the two components from the first beam displacer to the second beam displacer, in a manner which facilitates the definition of different optical path lengths therefor.

Alternatively, when two separate polarization beam displacers are utilized, then the two separate polarization beam displacers may be oriented linearly, i.e., in-line with and along a common axis with respect to, one another. In this instance, it is not necessary to provide prisms or mirrors to define the two different optical path lengths for the two components. Rather, the two optical path lengths may be defined by the insertion of materials having differing indices of refraction, intermediate the first and second beam displacer. Two such polarization beam displacers may have any desired position with respect to one another according to the present invention. Thus, the two polarization beam displacers may be orthogonal with respect to one another, or may be at any other desired angle with respect to one another.

Figure 6:
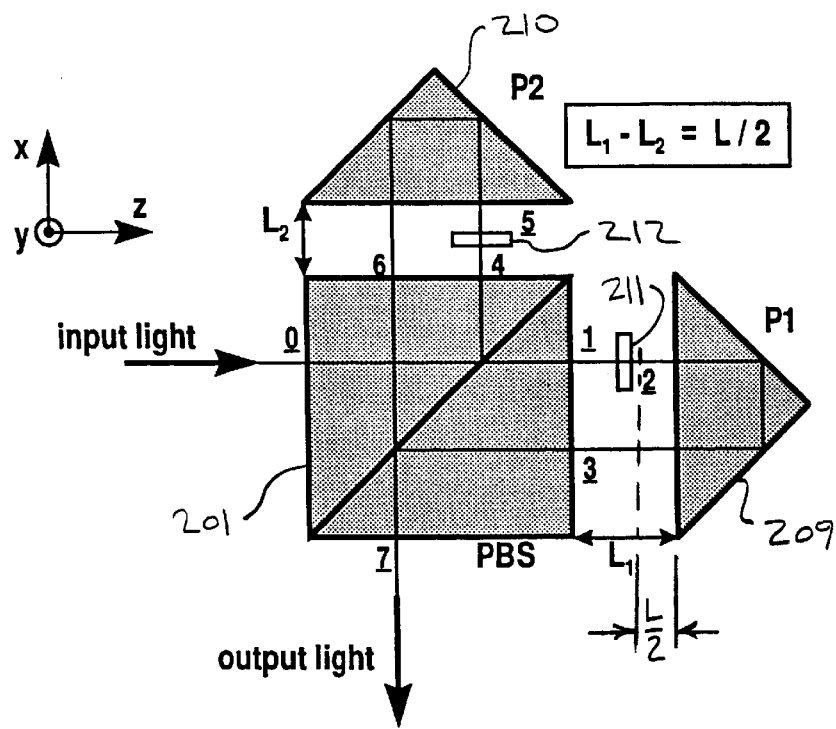
FIG. 6 is a schematic diagram of a top view of an alternative configuration of a birefringent device which utilizes a polarization beam splitter and prisms according to the present invention.

According to one configuration (such as that shown in FIG. 6) of the present invention, a polarization beam splitter is used to define two optical paths, each optical path having a different optical path length. When a polarization beam splitter is used to define two optical paths in a manner wherein beam splitting occurs twice (such as shown in FIG. 6) within the polarization beam splitter, each time at a different location, then two separate polarization beam splitters may be utilized in place of the single (as shown in FIG. 6) polarization beam splitter. That is, rather than having a single polarization beam splitter which splits light twice at two different locations therein, two separate polarization beam splitters may alternatively be utilized, wherein one polarization beam splitter is located at each of the two beam splitting locations.

According to the present invention, the first and second paths may comprise paths of air or vacuum or any other medium of desired properties, wherein the first and second components travel through materials having substantially similar indices of refraction. Alternatively, materials having different indices of refraction may be utilized in the first and second paths to provide different optical path lengths. Further, any desired combination of variation in physical path length and index of refraction between the first and second paths may be utilized, so as to provide the desired degree of birefringence.

Optionally, at least one of the first and second optical path lengths is variable, so as to facilitate changing of the amount of birefringence in the second composite light beam. Varying the optical path length of at least one of the first and second paths may be accomplished by varying the physical length of at least one of the first and second paths or by varying an index of refraction of a material disposed along at least one of the first and second paths. The physical length of the first and/or second path may be varied by moving a mirror or prism which defines the first and/or second path or by applying an electrical field, a magnetic field, or mechanical force to the material to change the refractive index thereof. Varying the index of refraction of a material disposed in the first and/or second path may be accomplished by selectively removing and inserting different materials into at least one of the first and second paths. For example, a filter wheel wherein each filter is configured to pass the first and/or second component and wherein each filter has a different index of refraction, may be utilized to selectively insert a desired filter (material having a desired index of refraction) into at least one of the first and second paths. Such a filter wheel may, for example, have a plurality of such filters disposed proximate a periphery thereof and would be rotatable so as to move a desired filter into at least one of the first and second paths.

Optionally, a half-wave waveplate is disposed along the first and second paths. The half-wave waveplate is preferably positioned where the first and second paths are co-located, such that a single half-wave waveplate affects both paths. Alternatively, two half-wave waveplates could be utilized, wherein each half-wave waveplate is only in one of the two paths.

In those configurations of the polarization beam displacer based birefringent device, wherein two polarization beam displacers are utilized and the two polarization beam displacers are in a linear or co-axial configuration with respect to one another, the half-wave waveplate may be omitted altogether. If the half-wave waveplate is omitted, then the second polarization beam displacer should be rotated 180020 around the light propagation direction, so that the two beams recombine.

Optionally, a second half-wave waveplate is provided at the output of the birefringent device, so as to orient the second composite output beam the same as the first composite or input light beam.

In those configurations of the birefringent device of the present invention which utilize the polarization beam splitter and mirrors, a quarter-wave waveplate is placed in each path such that each component passes through the quarter-wave waveplate twice (once on its way to a mirror and once on its return from the mirror).

In the birefringent device utilizing a polarization beam splitter and prisms, a half-wave waveplate is placed in each path such that each component passes through the quarter-wave waveplate once as it traverses a path.

The present invention thus utilizes a polarization separating device and a polarization combining device so as to effect splitting of an input light beam into components thereof and subsequent recombining of the components into an output light beam. According to one configuration of the present invention, the polarization separating device and the polarization combining device each comprise polarization beam splitters. According to another configuration of the invention, the polarization separating device and the polarization combining device each comprise polarization beam displacers.

As those skilled in the art will appreciate, a physical path length, as used herein, is the distance which a beam of light travels and the optical path length is the distance that the beam of light travels multiplied by the index of refraction of any materials that the beam of light is transmitted through along the path.

Figure 2A:
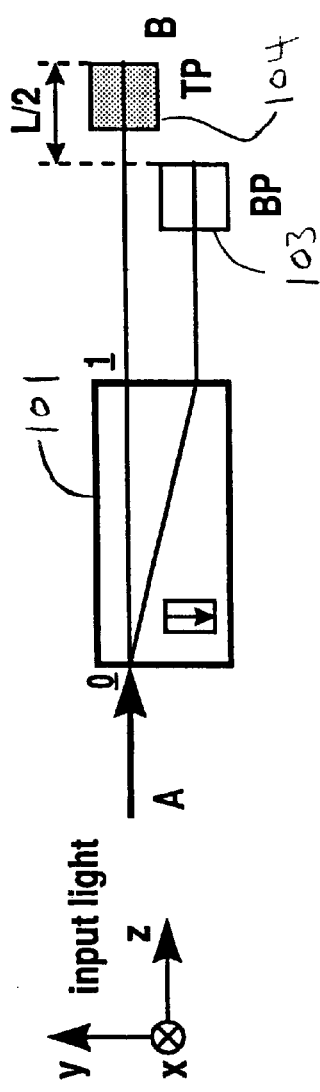
FIG. 2a is a schematic diagram showing a cross-sectional view of the first beam displacer and the prisms of FIG. 1.
Figure 2B:
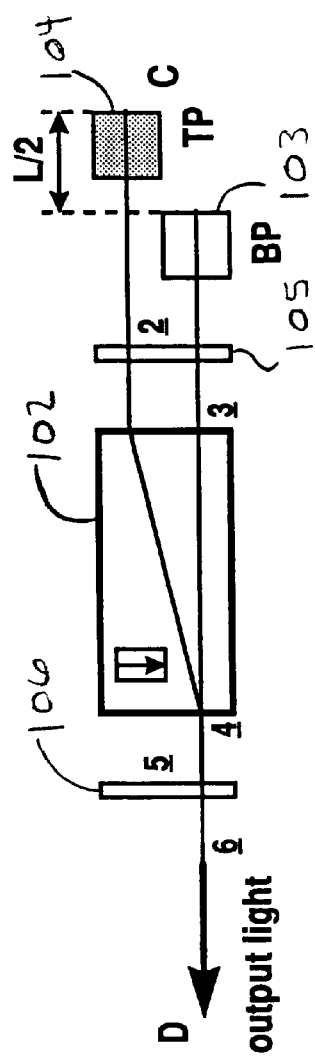
FIG. 2b is a schematic diagram showing a cross-sectional view of the second beam displacer and the prisms of FIG. 1.

Referring now to FIGS. 1, 2a and 2b, an exemplary embodiment of the present invention having two polarization beam displacers 101 and 102 is shown. It should be appreciated that, in the configuration shown in FIG. 1, wherein at least one prism is utilized to define the first and second paths, the two separate polarization beam displacers 101 and 102 may be replaced with a single polarization beam displacer which is configured such that the light paths remain substantially the same. That is, by merely substituting a single polarization beam displacer which is large enough to perform the functions of the two separate polarization beam displacers 101 and 102, the same effect may be achieved.

FIG. 1 is a top view of an exemplary birefringent device which consists of the two polarization beam displacers 101 and 102, two prisms 103 and 104, and two half-wave waveplates 105 and 106.

When a composite light beam, enters the first polarization beam displacer 101, the polarization beam displacer 101 splits the composite light input beam into two separate component beams (as best shown in FIG. 2a). The composite input beam is split according to the optical field polarization direction of the components thereof. For the input optical component polarized in the x direction (within the plane of the paper), the polarization beam displacer 101 does not substantially affect the path thereof and this component travels substantially straight through the polarization beam displacer 101. For the input component polarized in the y direction (which is perpendicular to the plane of the paper), the polarization beam displacer 101 displaces this component and this component leaves the polarization beam displacer 101 in the same direction as the composite input beam, but its optical path is shifted laterally (downwardly as shown in FIG. 2a) from the original path defined by the composite input beam.

According to the present invention, this shift in direction is used to facilitate the definition of two separate paths, wherein each path has a different optical path length, so as to create birefringence when the two components are recombined. The need for a birefringent crystal is eliminated and disadvantages associated with the use of such a birefimgent crystal are mitigated.

As shown in FIGS. 1, 2a and 2b, the arrows within the polarization beam displacers 101 and 102 show the direction in which one component of the composite beam is shifted. The direction in which the components are shifted can be seen most clearly in FIGS. 2a and 2b.

As shown in FIGS. 1, 2a and 2b, two prisms 103 and 104 are utilized. Prism 103 is a bottom prism and prism 104 is a top prism. The top prism 104 is farther away from the polarization beam displacers 101 and 102 than the bottom prism 103. Thus, two different paths, each path having a different physical length, are defined.

Optionally, a material having desired optical characteristics, e.g., temperature stability, may be disposed along that portion of the top path which defines the difference in path lengths (shown as L/2 in FIG. 1). As those skilled in the art will appreciate, having such a thermally stable material disposed within this area facilitates enhanced control over the optical properties for the optical path length difference. For example, when that portion of the upper path which defines the difference in path lengths (L/2 as shown in FIG. 1) is occupied by a material of extremely good thermal stability in its optical path length, then changes in temperature will not result in undesirable changes in optical path length difference between the first and second paths. Such material thereby provides good control of the birefringence value over the temperatures. By way of contrast, disposing a generally thermally stable material, i.e., a material which does not vary substantially in optical path length, in that area which defines the difference in path length (L/2 as shown in FIG. 1), results in changes in temperature having substantially less effect upon the birefringence value provided by the device.

One important aspect of this invention is the ability to control the difference in optical path length between the first and second paths, so that the birefringence value provided by this difference in optical path length does not vary undesirably during operation of the invention, such as due to temperature changes.

As those skilled in the art will appreciate, the birefringence values of a device determine the operational characteristics, i.e., transmission, dispersion, and phase distortion, thereof. Therefore, it is very important that the optical path length differences (and consequently the birefringence values) remain substantially fixed during operation of the devices.

Portions of the first and second paths, other than the portions which contribute the optical path length differences, are less critical since these other portions do not determine birefringence values. Generally, portions of the first and second paths, other than the portions which contribute to the optical path length differences, tend to vary in physical length and/or experience changes in an index of refraction thereof in response to environment (e.g., temperature) changes by approximately the same amount, due to structural similarity and symmetry of the first and second paths, and thus do not generally tend to change the optical path length difference. Therefore, it is that portion of the first and second paths (e.g., the L/2 or L portion shown in the figures) which directly provides the difference in optical path length that must be most carefully controlled.

According to the present invention, the difference in optical path length between the first and second paths may optionally be controlled by inserting a material having desired optical, thermal and/or mechanical properties into at least the longer of the two paths, so as to substantially fix the optical path length which defines the difference between the first and second paths. Thus, by inserting such a material into at least that portion of one path that defines an optical path length difference (e.g., the L/2 portion of the path shown in the figures), substantially more stable operation of the devices is achieved.

Optionally, according to the present invention, those portions of the first and second paths which do not contribute to the optical path length difference comprise air, vacuum or any other material. Of course, these portions of the first and second paths are inherently equal in physical lengths to one another (since they do not contribute to the optical path length difference).

As those skilled in the art will appreciate, a single prism may be utilized instead of the two separate prisms 103 and 104. In this instance, the physical path length would be the same for each path and a material having a desired index of refraction would be inserted into one of the two paths, so as to change the optical path length of that path and make the optical path lengths of the two paths different.

As a further alternative, the two prisms 103 and 104 may be eliminated altogether and the second polarization beam displacer 102 may be placed along the longitudinal axis of the first polarization beam displacer 101. In this co-linear configuration of the two polarization beam displacers, the first beam displacer separates the composite beam into two parallel traveled component beams. A material having a desired index of refraction is placed in the path of one of the two component beams so as to vary the optical path length thereof and so as to effect birefringence when the two component beams are recombined by the second beam displacer 102. However, the use of the prism(s) facilitate the economical use of a single beam displacer for both separating and recombining, as described above.

Those skilled in the art will appreciate that, rather than prisms 103 and 104, a set of mirrors may alternatively be utilized so as to redirect the component beams from the first polarization beam displacer 101 to the second polarization beam displacer 102, or from a single polarization beam displacer back to the same polarization beam displacers.

It is important to appreciate that in all of the drawings, where a coordinate system is utilized, light always travels in the +z direction. Thus, when the light changes direction, such as via the prisms of FIG. 1, then the coordinate system is transformed by the change of direction of the light such that the +z direction is still in the direction in which light propagates. Thus, in FIG. 1, the +z direction for the upper light path (such as though the input beam displacer 101) has the +z direction point to the right and the lower path (such as via output beam displacer 102) has the +z direction pointing to the left. This convention is particularly useful because it allows a single frame of reference or coordinate system to be utilized in the optical beam state diagrams (such as those of FIG. 3), wherein the beam states can thereby always be viewed as looking into on-coming light without a change of coordinate systems. Thus, as shown in FIG. 3, all of the optical beam states are viewed by looking in the −z direction (since the light is always propagating in the +z direction, toward the viewer).

Referring now to FIGS. 2a and 2b, the first prism 103 is shifted along the z axis with respect to the second prism 104 by a distance of L/2. As those skilled in the art will appreciate, such shifting provides a difference in path length between the first path and the second path of L. This distance may be varied, so as to facilitate corresponding variation in the amount of birefringence in the second composite light beam, by changing the distance by which the first prism 103 is shifted with respect to the second prism 104. This may be achieved either by moving the first prism 103 or by moving the second prism 104, along the z axis.

Figure 3:
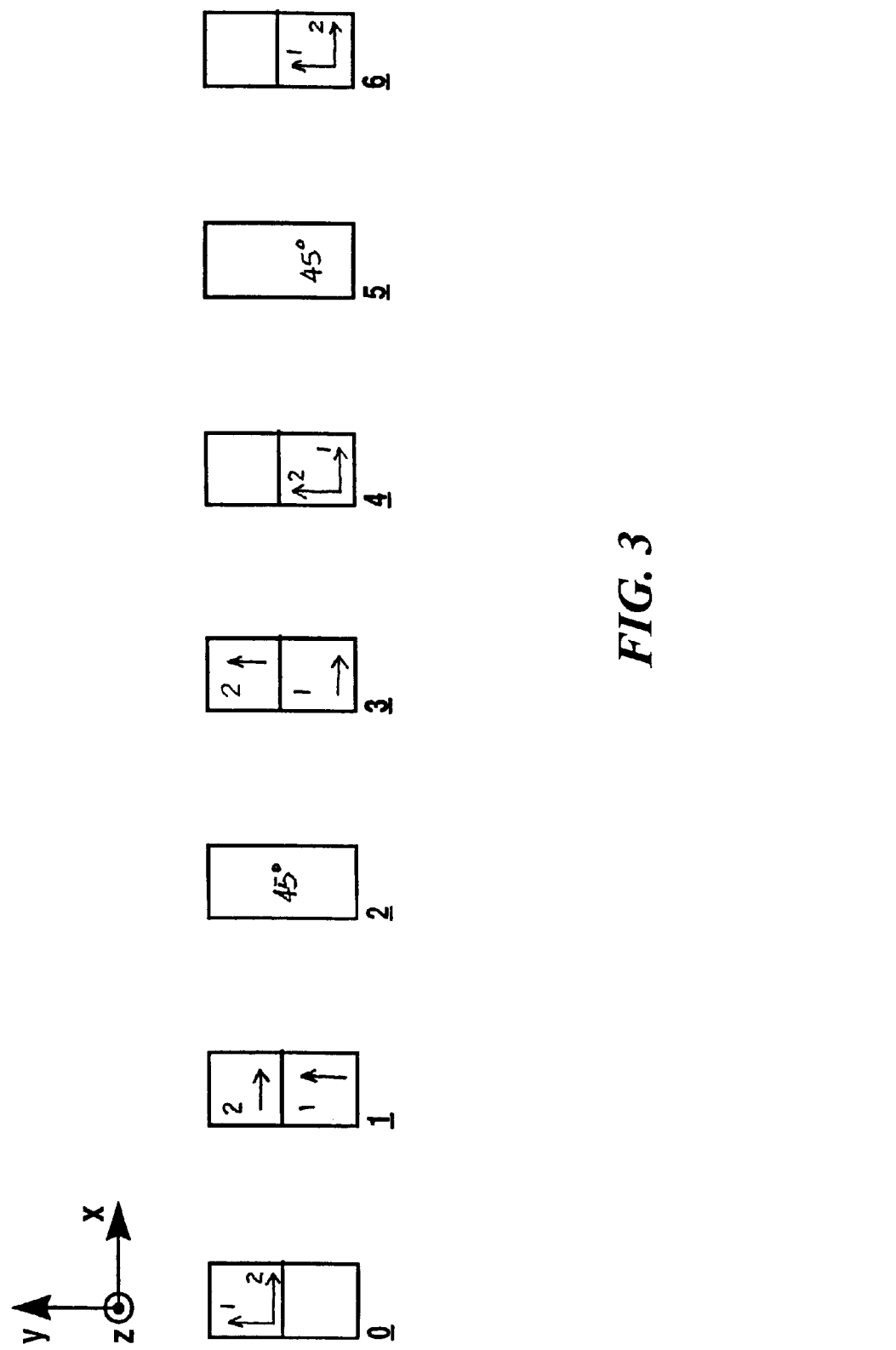
FIG. 3 is a series of frames, wherein each frame shows the state of the optical beam at the indicated locations of the birefringent device of FIGS. 1, 2a and 2b and also shows the half-wave waveplate orientations thereof.

Referring now to FIG. 3, the optical beam states and the half-wavelength waveplate orientations at various locations can be seen. The number for each frame shown in FIG. 3 corresponds to a physical location in FIGS. 1, 2a and 2b. Thus, frame 0 shows a composite beam having a first polarization along the y axis and a second polarization along the x axis and corresponds to the composite input light beam shown at position 0 in FIGS. 1, 2a and 2b. After the beam propagates through the first polarization beam displacer 101, component 2 remains at the top beam position and component 1 shifts to the bottom beam position. Component 2 enters the top prism and is reflected twice before being transmitted through the half-waveplate 105. Similarly, component 1 enters the bottom prism 103 and is reflected twice before being transmitted through the half-wave waveplate 105. The optical axis of the half-wave waveplate is shown in frame 2 and is oriented at 45° with respect to the +x axis. The half-wave waveplate changes the polarization direction of the components 1 and 2 by 90° as shown in frame 3. After the two components pass through the second polarization beam displacer 102, component 1 remains at the bottom beam position and component 2 shifts from the top beam position to the bottom beam position.

Because of the position difference between the top prism 104 and the bottom prism 103, there is a phase difference $\Gamma(\Gamma = L \cdot 2\pi/\lambda$, where $\lambda$ is the optical wavelength) between component 1 and component 2 when component 1 and component 2 are combined at location 4. In this manner, birefringence is created between the two orthogonally polarized components of the composite light beam.

Optionally, a second half-wave waveplate 106 may be plotted at the output of the second polarization beam displacer 102 and oriented at 45° with respect to the +x axis, so as to change the polarization directions of components 1 and 2 back to their original directions as shown in frame 6.

According to the present invention, birefringence is created by providing a difference in optical path length, i.e., by providing a difference in either physical path length or index of refraction. Creating birefringent with differing optical path lengths provides many advantages of the present invention as compared to contemporary birefringement elements, which utilizes birefringent crystals. For example, the birefringence value which may be obtained according to the present invention is comparatively large. Further, by controlling the relative positions of the prisms or mirrors or by varying an index of refraction, the birefringence is tunable and either negative or positive birefringence can selectively be obtained from the same device configuration. Because the beam shift is symmetric in the apparatus, the polarization mode dispersion (PMD) is minimized.

Optionally, ultra-low expansion (ULE) or fused silica, or any other desired material having a very low thermal expansion coefficient may be utilized as a gasket, package, optical bench or mounting bracket to mount or host the device components, i.e., polarization beam displacer(s) and the prism(s) or mirrors, so as to enhance temperature stability.

According to the present invention, the cost of both materials and assembly is substantially mitigated as compared to contemporary birefringent devices.

Figure 4:
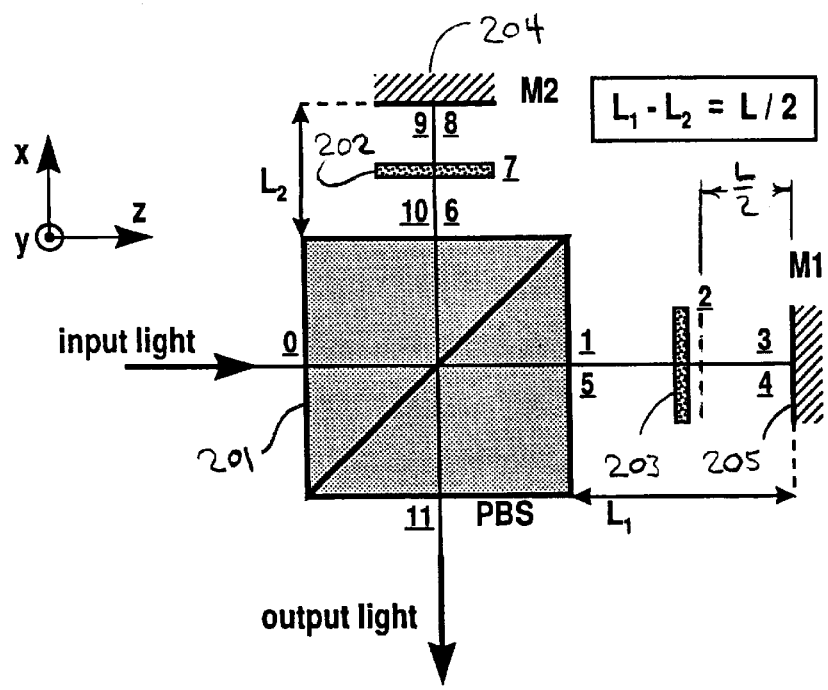
FIG. 4 is a top view of an alternative configuration of a birefringent device which utilizes a polarization beam splitter and mirrors according to the present invention.

Referring now to FIGS. 4–7, a birefringent device utilizes a polarization beam splitter, rather than the polarization beam displacers shown in FIGS. 1–3. With particular reference to FIG. 4, a top view of the birefringent device has the polarization beam splitter 201, two quarter-wave waveplates 202 and 203 and two etalons or mirrors 204 and 205.

When a composite beam enters the polarization beam splitter 201, the composite beam splits into two component beams according to their optical field polarization directions. For the input optical component polarized in the x direction (within the plane of the paper), that component leaves the polarization beam splitter 201 in a propagation direction which is parallel to the input beam propagation direction. For the input optical component which is polarized in the y direction (which is perpendicular to the plane of the paper), that component leaves the polarization beam splitter 201 in a propagation direction which is orthogonal to the input beam propagation direction.

Figure 5:
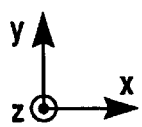
FIG. 5 is a series of frames wherein each frame shows the state of the optical beam at the indicated locations of the birefringent device of FIG. 4 and also shows the half-wave waveplate orientations thereof.
Figure 5:
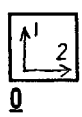
Figure 5:
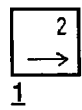
Figure 5:
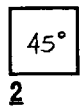
Figure 5:
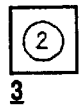
Figure 5:
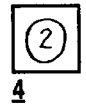
Figure 5:
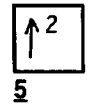
Figure 5:
Figure 5:
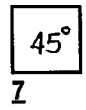
Figure 5:
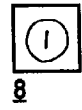
Figure 5:
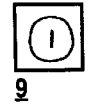
Figure 5:
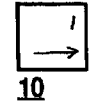
Figure 5:
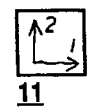

Referring now to FIG. 5, the optical beam states and the quarter-wave waveplate orientations at various locations for the birefringent device shown in FIG. 4 are provided. At location 0, the input polarization optical beam has two linearly polarized components, i.e., 1 (which is along the y direction) and 2 (which is along the x direction). Only component 2 travels to location 1. The optical axis of the quarter-wave waveplate at location 2 is oriented at 45° with respect to the +x axis. Thus, the light at location 3 is circularly polarized. After light is reflected by mirror 205, the light remains circularly polarized with a reverse rotation direction at location 4. After the light passes through the quarter-wave waveplate, it becomes a linearly polarized light component with a polarization direction along the y direction at location 5. When this component enters the polarization beam splitter 201, it is reflected so as to propagate to location 11 and thereby help define the composite output light beam.

Similarly, for component 1, light travels through locations 6, 7, 8, 9, and 10. Similarly, the optical axis of the quarter-wave waveplate at location 7 is oriented at 45° with respect to the +x axis. At location 10, the linear polarized light has a polarization direction along the x direction. Thus, component 1 can propagate directly from location 10 to location 11.

Since the distance between the polarization beam splitter 201 and the first mirror 205 is $L_1$, and the distance between the polarization beam splitter 201 and the second mirror 204 is $L_2$, which is different from $L_1$, there is a phase difference $\Gamma$ ($\Gamma=2\cdot(L_1-L_2)\cdot 2\pi/\lambda = L\cdot 2\pi/\lambda$, where $\lambda$ is the optical wavelength) between component 1 and component 2 when component 1 and component 2 are combined at location 11. Thus, birefringence is created between the two orthogonally polarized components. Optionally, a half-wave waveplate (not shown) oriented at 45 degrees with respect to the +x axis may be positioned beyond location 11, so as to change the polarization directions of components 1 and 2 to their original directions.

Alternatively, birefringence can be obtained by inserting a material having a desired index of refraction into one of the two optical paths, rather than by forming the two optical paths so as to have different physical lengths. The material is configured so as to provide a phase delay in the path into which it is inserted and with respect to the other path, such that the desired birefringence value is obtained. That is, the length of the material inserted and the index refraction thereof is such that the desired phase delay, and consequently the desired value of birefringence is obtained.

As mentioned above, the portion of one path which contributes to the difference in path lengths (e.g., an L/2 portion between location 1 and location 2 in FIG. 4) may be filled with a material having desired optical, thermal or mechanical properties. One advantage of inserting such a material into this area is control of the birefringence value over various temperatures, as discussed above. Another advantage of inserting such a material is that the optical path difference can be realized with smaller space. Indeed, any of the path lengths of any of the configuration of the patent invention may be shortened if desired, via the insertion of such material.

Referring now to FIG. 6, an alternative configuration of the birefringent device comprises polarizing beam splitter 201, first right-angle prism 209 and second right-angle prism 210. A first half-wave waveplate 211 is disposed intermediate the first prism 209 and the polarization beam splitter 201 and a second half-wave waveplate 212 is disposed intermediate the second prism 210 and the polarization beam splitter 201. It is important to appreciate that in the birefringent device shown in FIG. 6, the component light beams entering and exiting the first 209 and second 210 prisms are parallel to one another, but are also offset with respect to one another. By way of contrast, the light beams instant upon and reflected from the mirrors 204 and 205 of the birefringent device shown in FIG. 4 are coincident with one another, although they travel in different directions.

As those skilled in the art will appreciate, the use of prisms, 209 and 210, as shown in FIG. 6, rather than mirrors, 204 and 205, as shown in FIG. 4, provides an important advantage with respect to the undesirable feedback of light to the input light source. When mirrors are shown in FIG. 4, then some portion of the light returning to the polarization beam splitter 201 from the mirror 205 will be transmitted from the polarization beam splitter 201 back to the light source, where undesirable feedback will occur. However, when the prism 209 in FIG. 6 returns light to the polarization beam splitter 201, that light is returned as a different position with respect to which the light was originally split. Thus, none of the light returned to the polarization beam splitter 201 by the prism 209 is transmitted back to the light source and such undesirable feedback is thus avoided.

Figure 7:
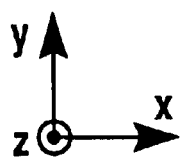
FIG. 7 is a series of frames wherein each frame shows the state of the optical beam at the indicated locations of the birefringent device of FIG. 6 and also shows the half-wave waveplate orientations thereof.
Figure 7:
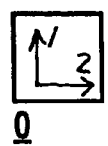
Figure 7:
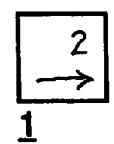
Figure 7:
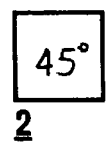
Figure 7:
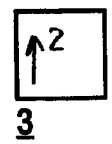
Figure 7:
Figure 7:
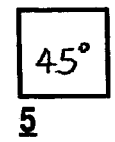
Figure 7:
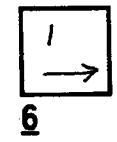
Figure 7:
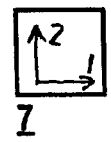

The optical beam states and the half-wave waveplate orientations at various locations are schematically shown in FIG. 7. The input light component polarized along the x direction propagates through locations 1, 2, and 3 and the light component polarized along the y direction propagates through locations 4, 5 and 6. The two components join each other at location 7. Similarly, the phase difference $\Gamma$ between the two orthogonally polarized light components is controlled by the position of the prisms with respect to the PBS ($\Gamma = L\cdot 2\pi/\lambda$).

As in the previously discussed embodiments of the present invention, the difference in path length may be provided by making the L1 between the first prism 209 and the polarization beam splitter 207 different from the distance L2 between the second prism 210 and the polarization beam splitter 201. Alternatively, a material having a desired index refraction may be positioned along either the first or second path so as to cause the optical path lengths to differ. Negative or positive birefringence can be obtained from the same device configuration.

As before, using an ultralow expansion (ULE) or fused silica or any other material having a very low thermal expansion coefficient as a gasket to mount or host the device components, i.e., the polarization beam splitter 201 and the prisms 209 and 210 will provide enhanced temperature stability.

As mentioned above, the single polarization beam splitter 201 may, optionally, be replaced with two separate beam splitters, if desired.

The description contained herein is directed primarily to the configuration of an interleaver as a demultiplexer. However, as those skilled in the art will appreciate, the present invention may be used in both demultiplexers and multiplexers. The difference between demultiplexers and multiplexers is small and the configuration of the present invention as either desired device is well within the ability of one of the ordinary skill in the art.

Two different reference systems are used in this patent application for the determination of angular orientations. One reference system is used for the determination of the angular orientations of birefringent elements, such as birefringent crystals with respect to the polarization direction of input light. Another reference system is used for the determination of the angular orientations of birefringent elements and the angular orientations of waveplates with respect to a moving (x, y, z) coordinate system. Thus, for the birefringent crystal angular orientations, two separate reference systems are utilized. Thus, when reading the detailed description below, it will be very helpful to understand these two reference systems.

When angular orientations of birefringent elements are discussed, the angular orientations are typically the fast axes of the birefringent elements with respect to the polarization direction of incoming light just prior to the incoming light reaching a birefringent element. Determination of these angular orientations is made by observing oncoming light with the convention that the angle is positive if the rotation of the fast axis is clockwise with respect to the polarization direction of the oncoming light and is negative if the rotation is counterclockwise with respect to the polarization direction of the oncoming light.

If there is a series of birefringent elements, such as in a birefringent filter, the angular orientations of each of the elements of the filter are measured by their fast axes with respect to the polarization direction of incoming light just prior to the incoming light reaching the first birefringent element of the filter. If there are more than one birefringent filters in a sequence, then the angular orientations are determined separately for each birefringent filter (the angular orientations are measured with respect to the polarization direction if incoming light just prior to the incoming light reaching the first birefringent element of each different filter). Thus, each birefringent filter has its own independent reference for the determination of the angular orientations of the birefringent elements thereof.

By the way of contract, the angular orientation of birefringent elements and angular orientations of waveplates are also measure by the fast axes of birefringent elements and optic axes of waveplates with respect to the +x axis. However, it is very important to appreciate that the +x axis is part of the moving coordinate frame. This coordinate frame travels with the light, such that the light is always traveling in the +z direction and such that the +y axis is always up as shown in the drawings. Thus, when the light changes direction, the coordinate frame rotates with the +y axes thereof so as to provide a new coordinate frame. The use of such a moving coordinate frame allows the optical beam states, the birefringent elements, and the waveplates to be viewed in a consistent manner at various locations in the devices, i.e., always looking into the light, and therefore substantially simplifies viewing and analysis of the devices.

Determination of the angular orientations in (x, y, z) coordinate system is made by observing oncoming light with the convention that the angle is positive if the rotation of the corresponding optical axis is counter-clockwise with respect to +x axis and is negative if the rotation is clockwise with respect to the +x axis (which is consistent the conventional use of x, y, z coordinate system, but which is contrary to the sign convention for determining the angular orientations of birefringent elements, as discussed above).

As used herein, the term gasket is defined to include any bracket, mount, optical bench, host, enclosure or any other structure which is used to maintain components of the present invention in desired positions relative to one another. Preferably, such gasket is comprised of an ultra low expansion (ULE) material, fused silica or any other material having a very low thermal expansion coefficient.

It is understood that the exemplary birefringent devices described herein and shown in the drawings represent only presently preferred embodiments of the invention. Indeed, various modifications and additions may be made to such embodiments without departing from the spirit and scope of the invention. For example, those skilled in the art will appreciate that mirrors and prisms are generally interchangeable as light reflecting devices for defining the first and second physical path lengths. Also, various different layouts were configurations of the various different components of the present invention are contemplated. Generally, layouts are suitable which provide for different optical path lengths for the first and second paths. Thus, these and other modifications and additions may be obvious to those skilled in the art and may be implemented to adapt the present invention for use in a variety of different applications.

What is claimed is:

1. A polarization beam splitter birefringent device comprising:
   a polarization beam splitter configured to split a first composite light beam into first and second components thereof, the first and second components being orthogonally polarized with respect to one another;
   a first reflector comprising a prism and configured to at least partially define a first path which is configured to transmit the first component, the first path having a first optical length;
   a second reflector comprising a prism and configured to at least partially define a second path which is configured to transmit the second component, the second path having a second optical length, the second optical path length being different with respect to the first optical path length;
   a first half-wave waveplate in the first path intermediate the first reflector and the polarization beam splitter, the first half-wave waveplate being configured so as to transmit the first component either before or after the first component has been reflected by the first reflector;
   a second half-wave waveplate in the second path intermediate the second reflector and the polarization beam splitter, the second half-wave waveplate being configured so as to transmit the second component either before or after the second component has been reflected by the second reflector; and
   wherein the polarization beam splitter is further configured to recombine the first and second components so as to form a second composite light beam.

2. The polarization beam splitter birefringent device as recited in claim 1, wherein the first path has a physical path length that is different from a physical path length of the second path.

3. The polarization beam splitter birefringent device as recited in claim 1, wherein an index of refraction is different for at least a portion of the first and second paths, so as to cause the first and second paths to have different optical lengths.

4. The polarization beam splitter birefringent device as recited in claim 1, wherein at least one of the first path length and the second path length is variable so as to facilitate changing of the amount of birefringence in the second composite light beam.

5. The polarization beam splitter birefringent device as recited in claim 1, wherein at least one of the optical first path length and the optical second path length is variable by varying and index of refraction of at least a portion thereof, so as to facilitate changing of the amount of the birefringence in the second composite light beam.

6. The polarization beam splitter birefringent device as recited in claim 1, wherein a difference in path lengths between the first and second paths is provided by a material having an index of refraction greater than one disposed within at least a portion of one of the first and second paths.

* * * * *